US011988746B2

(12) United States Patent
Remesch et al.

(10) Patent No.: US 11,988,746 B2
(45) Date of Patent: May 21, 2024

(54) MULTI-AXIS VELOCITY AND RANGEFINDER OPTICAL MEASUREMENT DEVICE

(71) Applicant: Waymo LLC, Mountain View, CA (US)

(72) Inventors: Bryce Remesch, Hollis, NH (US); Nicholas Armstrong-Crews, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 818 days.

(21) Appl. No.: 17/247,835

(22) Filed: Dec. 24, 2020

(65) Prior Publication Data
US 2022/0206150 A1 Jun. 30, 2022

(51) Int. Cl.
*G01S 17/00* (2020.01)
*G01S 7/481* (2006.01)
(Continued)

(52) U.S. Cl.
CPC ............ *G01S 17/58* (2013.01); *G01S 7/4814* (2013.01); *G01S 7/4816* (2013.01); *G01S 17/06* (2013.01)

(58) Field of Classification Search
USPC ......................................................... 356/28
See application file for complete search history.

(56) References Cited

U.S. PATENT DOCUMENTS

2014/0034820 A1 * 2/2014 Fattal .................... G01J 1/0411
359/569
2016/0202090 A1 7/2016 Cvijetic et al.
(Continued)

FOREIGN PATENT DOCUMENTS

CN 105300517 A * 2/2016
CN 209541766 U * 10/2019 ........... G01C 19/721
(Continued)

OTHER PUBLICATIONS

Courtial J. et al., "Measurement of the Rotational Frequency Shift Imparted to a Rotating Light Beam Possessing Orbital Angular Momentum", The American Physical Society, Physical Review Letters, vol. 80, No. 15, Apr. 13, 1998, pp. 3217-3219.
(Continued)

*Primary Examiner* — James R Hulka
(74) *Attorney, Agent, or Firm* — Lowenstein Sandler LLP

(57) ABSTRACT

The subject matter of this specification can be implemented in, among other things, a system that includes a light source to produce a first beam and one or more first optical elements to impart an orbital angular momentum (OAM) to at least some of a plurality of output beams obtained from the first beam. The system further includes an output optical device to direct the output beams towards a target object and a plurality of photodetectors to generate signals representative of a difference between an input phase information, carried by one or more beams reflected from the target object, and an output phase information, carried by one of local copies of the output beams. The system further includes a processing device to determine, using the difference between the input phase information and the output phase information, one or more orthogonal components of a velocity of the target object.

20 Claims, 8 Drawing Sheets

(51) Int. Cl.
*G01S 17/06* (2006.01)
*G01S 17/58* (2006.01)

(56) References Cited

U.S. PATENT DOCUMENTS

2017/0138851 A1* 5/2017 Ashrafi ............... G01N 33/487
2017/0212238 A1 7/2017 Milione
2018/0067045 A1 3/2018 Ashrafi et al.
2018/0128739 A9* 5/2018 Ashrafi .............. G01N 21/6486

FOREIGN PATENT DOCUMENTS

JP 2018132500 A 8/2018
WO WO-2017123926 A1 * 7/2017 ........... A61B 5/0075

OTHER PUBLICATIONS

Cvijetic, N. et al., "Detecting Lateral Motion Using Light's Orbital Angular Momentum" Scientific Reports, 5:15422. DOI: 10.1038/srep15422, published Oct. 23, 2015, pp. 1-7.
Lavery, M.J.P. et al., "Detection of Spinning Object Using Light's Orbital Angular Momentum", Science, 341 (6145), pp. 537-540, ISSN 0036-8075, Copyright 2013 American Association for the Advancment of Science.
Padgett, M. et al., "Light's Orbital Angular Momentum" American Institute of Physics, S-0031-9228-0405-010-0, Physics Today, May 2004, pp. 35-40.
AEYE iDAR "iDAR is Smarther than LiDAR", aeye.ai/idar/, retrieved Oct. 20, 2020, 11 pages.
Aurora "FMCW Lidar: the Self-Driving Game-Changer" medium.com/aurora-blog/fmcw-lidar-the-self-driving-game-changer-194fd311fd0e9, Apr. 9, 2020, retreived on Oct. 20, 2020, 6 pages.
GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.
Lekavich, John, "Basics fo Acousto-Optic Devices", Lasers & Applications Apr. 1986, pp. 59-64.
International Search Report for International application No. PCT/US2021/064683, dated Apr. 18, 2022, 10 pages.
Zijing Zhang et al., ""Rotation velocity detection with orbital angular momentum light spot completely deviated out of the rotation center"", Optics Express, Feb. 24, 2020, vol. 28, No. 5, pp. 6859-6867, p. 6859, line 9—p. 6866, line 13, 9 pages.
Neda Cvijetic et al., ""Detecting Lateral Motion using Light's Orbital Angular Momentum"", Scientific Reports, Oct. 23, 2015, vol. 5, Article No. 15422, pp. 1-7, DOI: 10.1038/srep15422, p. 1, line 14—p. 5, line 38, 8 pages.

* cited by examiner

MULTI-AXIS VELOCITY AND RANGEFINDER OPTICAL MEASUREMENT DEVICE

TECHNICAL FIELD

The instant specification generally relates to range and velocity measurements in applications that involve determining locations and velocities of moving objects. More specifically, the instant specification relates to single-measurement detection of multiple spatial components of the velocity of a moving object without the need to probe consecutive positions of the object.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (towards) the rangefinder, the frequency of the arrived signal is lower (higher) than the frequency of the emitted signal, and the change in the frequency is proportional to the radial component of the object's velocity. Autonomously or semi-autonomously driven vehicles operate by sensing an outside environment with various electromagnetic (e.g., radio, optical, infrared) sensors and charting a driving path through the environment based on the sensed data. Additionally, the driving path can be determined based on positioning (e.g., Global Positioning System (GPS)) and road map data. While the positioning and the road map data can provide information about static aspects of the environment (buildings, street layouts, etc.), dynamic information (e.g., information about other road users such as vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1A:
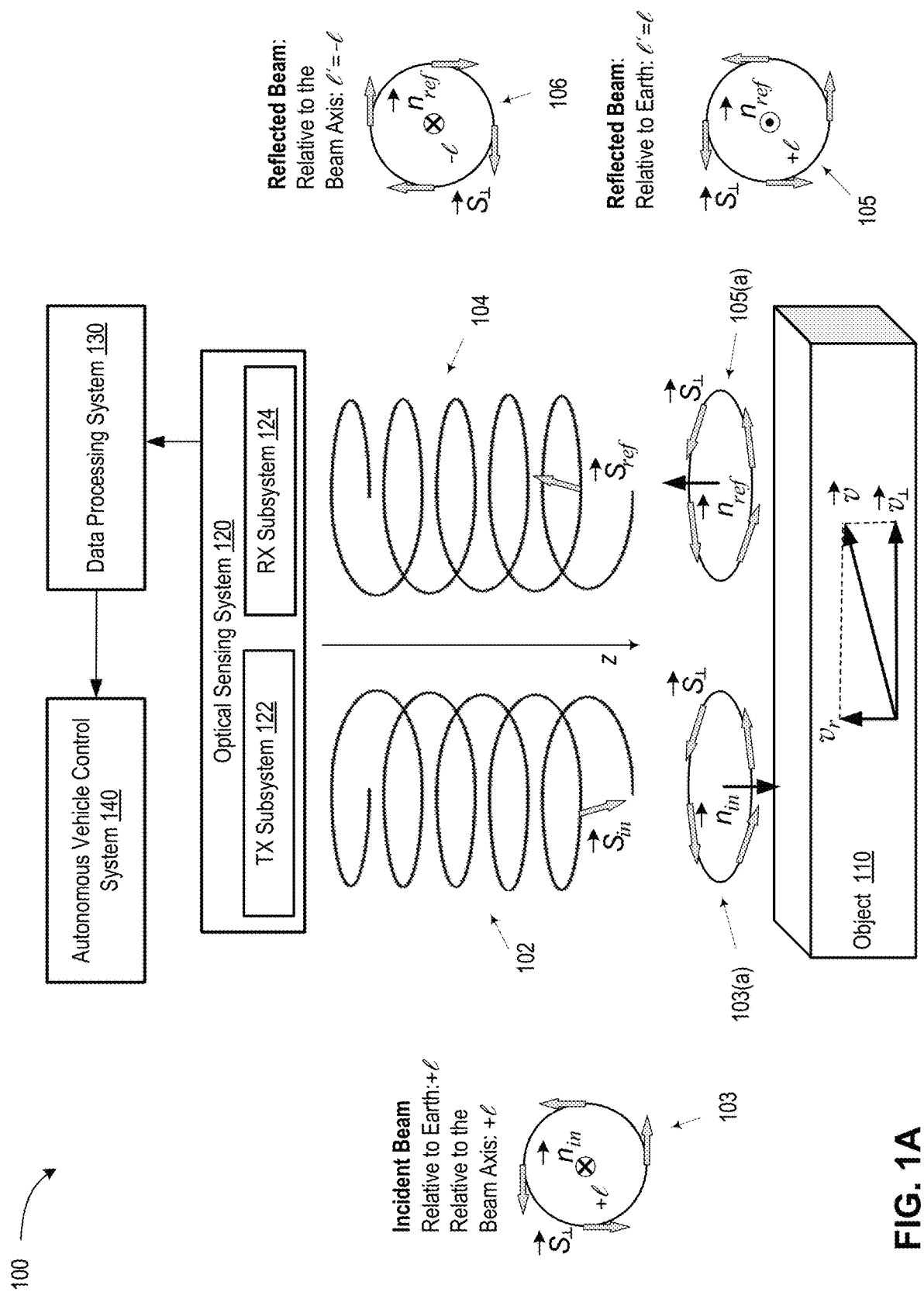
FIG. 1A is a high-level diagram illustrating an example implementation of architecture and components of a multi-axis velocity detection technology used in the context of autonomous vehicles, in accordance with some aspects of the present disclosure.

In one implementation, disclosed is a system that includes a light source to produce a first beam; one or more first optical elements to impart an orbital angular momentum to at least some of a plurality of output beams, wherein each of the plurality of output beams is obtained from the first beam; an output optical device to direct the plurality of output beams towards a target object; a plurality of photodetectors, wherein each of the plurality of photodetectors is to generate a signal representative of a difference between an input phase information, carried by one of a plurality of reflected beams, and an output phase information, carried by one of a plurality of local copies of the output beams, wherein at least one of the plurality of reflected beams is reflected from the target object in response to the plurality of output beams interacting with the target object; and a processing device to determine, using the difference between the input phase information and the output phase information, one or more components of a velocity of the target object, wherein the one or more components are orthogonal to a direction to the target object.

In another implementation, disclosed is a system that includes a light source to produce a first beam; one or more first optical elements to impart an orbital angular momentum to at least some of a plurality of output beams, wherein each of the plurality of the output beams is obtained from the first beam; an output optical device to direct the plurality of output beams towards a target object; a plurality of photodetectors, wherein each of the plurality of photodetectors is to generate an analog signal representative of a difference between an input phase information, carried by one of a plurality of reflected beams, and an output phase information, carried by one of a plurality of local copies of the output beams, wherein at least one of the plurality of reflected beams is reflected from the target object in response to the plurality of output beams interacting with the target object; and an analog-to-digital converter to convert, for each of the plurality of photodetectors, the analog signal generated by a respective photodetector into a digital signal readable by a processing device.

In another implementation, disclosed is a method that includes producing, by a light source, a first beam; imparting, using one or more first optical elements, an orbital angular momentum to at least some of a plurality of output beams, wherein each of the plurality of the output beams is obtained from the first beam; directing, by an output optical device, the plurality of output beams towards a target object; generating, using a plurality of photodetectors, a signal representative of a difference between an input phase information, carried by one of a plurality of reflected beams, and an output phase information, carried by one of a plurality of local copies of the output beams, wherein at least one of the plurality of reflected beams is reflected from the target object in response to the plurality of output beams interacting with the target object; and determining, by a processing device, using the generated signal, one or more components of a velocity of the target object, wherein the one or more components are lateral to a direction to the target object.

In one variation of the method disclosed, at least some of the plurality of photodetectors include a first photodiode and a second photodiode, the first photodiode to receive a reflected beam of the plurality of reflected beams, and the second photodiode to receive a local copy of the plurality of the local copies of the output beams.

In another variation of the method disclosed, at least some of the plurality of output beams are angle-modulated beams, wherein angle modulation includes at least one of a phase modulation or a frequency modulation.

DETAILED DESCRIPTION

Light detection and ranging (lidar) technology is used in autonomous driving and autonomous vehicle applications, highway traffic control, aviation traffic control, naval vessel detection and navigation, atmospheric studies, marine studies, agricultural operations, warehouse applications, and in many other applications. A lidar unit (also referred to herein as a "lidar") emits one or more laser signals (beams, pulses) that travel to an object and then detects signals reflected from the object. Subsequently, the lidar processes the information carried by the signals. The information can include a time of flight, a frequency change or a phase shift, reflectivity of the surface of the object, type and quality of the surface, and so on. Reliable, quick, and efficient determination of the velocities of various objects can be one of the main objectives of lidar detection technology.

ToF lidars are typically used for ranging and can also be capable of determining velocities of objects in the environment, e.g., by detecting two (or more) locations $\vec{r}(t_1)$, $\vec{r}(t_2)$ (which can be characterized by Cartesian, spherical, cylindrical, and so on, coordinates) and infer the velocity as the ratio, $\vec{v}=[\vec{r}(t_2)-\vec{r}(t_1)]/[t_2-t_1]$. By design, the measured velocity $\vec{v}$ is not the instantaneous velocity of the object but rather the velocity averaged over the time interval $t_2-t_1$. A ToF lidar may not be able to ascertain whether the object maintained the same velocity $\vec{v}$ during this time or experienced an acceleration or deceleration. Increasing resolution by reducing the duration of the measurement time $t_2-t_1$ may provide more information but has its own limitations. As position and time are detected by a lidar device with some intrinsic measurement accuracies $\Delta\vec{r}$ and $\Delta t$ (being limited by the wavelength, precision of various optical and electronic components of the lidar, information processing capability, and so on), reducing the differences $\vec{r}(t_2)-\vec{r}(t_1)$ and $t_2-t_1$ may be viable as long as these differences remain larger than the corresponding accuracies $\Delta\vec{r}$ and $\Delta t$. In some cases, shorter time intervals $t_2-t_1$ may even lead to a decreased accuracy of the velocity determination. Additionally, shorter time intervals may impose the need to obtain and process additional sensing signals, with corresponding demands to computational capabilities and power consumption of lidar devices.

Coherent lidars operate by detecting a change in the phase information of the returned signal, often measured as a change in frequency—the Doppler shift indicative of the velocity of the reflecting surface. Such detection is capable of determining, using a single laser signal, the radial component of the velocity parallel to the direction of the signal propagation. However, the Doppler shift may not be sensitive (at least without probing a broader spatial distribution of the reflected intensity) to the lateral motion of the object (e.g., up or down, left or right). Accordingly, determination of the lateral motion may still involve ToF multiple-measurement tracking technology and even tracking a lateral motion of the entire object (e.g., motion of a contour or outline of the object), which may be, optically and computationally, a complex operation.

Aspects and implementations of the present disclosure enable systems and methods for multi-axis velocity determination using coherent electromagnetic signals with imparted optical angular momentum (OAM) signatures. Conventional lidar technology employs beams and wave packets with flat phase fronts, in which the energy flux (the Poynting vector) is parallel to the axis of the beam, which is also the direction of the beam's propagation, e.g., from the lidar device to the target (for the transmitted beam incident on the target) and from the target to the lidar device (for the reflected beam). Implementations of the present disclosure involve formation and use of beams with imparted OAM ("OAM beams") for detection of multiple components of the velocity using a single set of signals that are output concurrently (as opposed to time-spaced signals, as in the conventional range-finding technology). OAM beams (also known as vortex beams or twisted beams) are capable of determining multiple various components of the object's velocity, thereby overcoming lack of sensitivity of the conventional beams with flat phase fronts to the lateral motion of the objects.

Figure 1B:
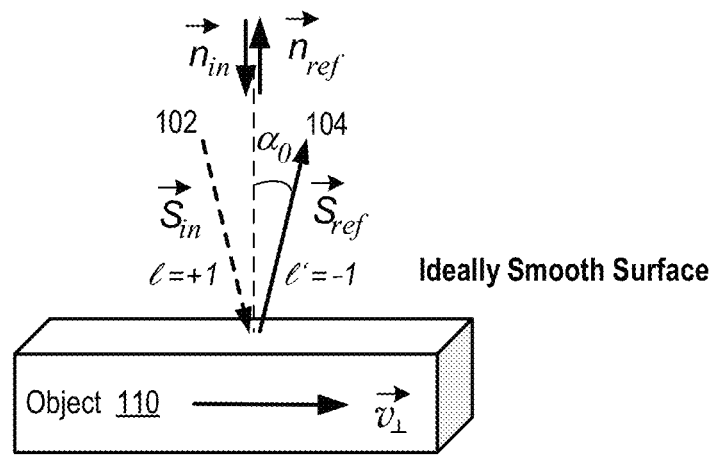
FIG. 1B is a schematic depiction of a geometry of reflection, from an ideally smooth surface, of an incident beam with a non-zero angular momentum.

FIG. 1A is a high-level diagram illustrating an example implementation of architecture 100 and components of a multi-axis velocity detection technology used in the context of autonomous vehicles, in accordance with some aspects of the present disclosure. A detection system whose architecture 100 is illustrated in FIG. 1A can include an optical sensing system 120 configured to produce and output (e.g., by a TX subsystem 122) an incident beam 102 and to receive and process (e.g., by an RX subsystem 124) a reflected beam 104. As depicted schematically in FIG. 1A, an OAM beam (e.g., beam 102 incident on an object 110) can have a helical phase structure described by the factor $e^{il\phi}$, where l is an integer number and $\phi$ is the azimuthal angle around the axis of the beam within a plane (e.g., xy) perpendicular to the beam axis. The value hl (h being Planck's constant) represents the angular momentum carried by each photon of the beam. The wave front of the beam can be visualized as a helical surface (similar to a spiral staircase) with the normal to the helical surface also being the local direction of the Poynting vector $\vec{S}$, as indicated schematically by the helix of incident beam 102 in FIG. 1A. The Poynting vector has an azimuthal component $\vec{S}_\perp$ that circulates around the axis of the OAM beam, $\vec{S}=(S_\perp \cos\phi, S_\perp \sin\phi, S_z)$, where $S_z$ is radial component of the Poynting vector and $S_\perp$ is the absolute value of $\vec{S}_\perp$. A positive value of l corresponds to a right-handed helix while a negative value of l corresponds to a left-handed helix (on the helix, the phase of the wave $e^{ikz+il\phi}$ has the same value: $\phi(z)=\phi_0-kz/l$). The angle α that the Poynting vector makes with the beam's axis (z-axis), can depend on the OAM value l (the tangent function of the angle is $\alpha=S_\perp/S_z$). For some OAM beams, the angle can be $\alpha=l\lambda/(2\pi\rho)$, where λ is the wavelength of the beam and ρ is the radial distance from the axis of the beam. As an illustrative example, whose geometry is also depicted in FIG. 1B, an incident beam 102 propagating along a direction $\vec{n}_{in}$ perpendicular to an ideally smooth surface of an object 110, strikes the surface and produces a reflected beam 104 with the reversed direction of propagation, $\vec{n}_{ref}=-\vec{n}_{in}$. (The angle that the Poynting vector makes with the direction of beam propagation is exaggerated for the convenience of viewing.) Similarly, the radial component of the Poynting vector $S_z$ is reversed upon reflection: $S_z \rightarrow -S_z$. The lateral (azimuthal) components of the Poynting vector $\vec{S}_\perp$, on the other hand, do not change upon reflection (from an ideal surface), so that the direction of circulation of $\vec{S}_\perp$, in the reflected beam 104 remains the same relative to Earth (or to object 110).

Diagrams 103, 104, and 105 illustrate what happens to the angular momentum values of the beams upon reflection. Diagram 103 depicts a circulation of the lateral (azimuthal) part $\vec{S}_\perp$ of the Poynting vector $\vec{S}$ in the incident beam 102 for a positive OAM value +l, when viewed along the positive direction of z-axis (diagram 103(a) is a perspective depiction corresponding to diagram 103). For the choice of z-axis as shown, incident beam 102 has the same OAM value +l relative to Earth and relative to the beam axis $\vec{n}_{in}$ (which for an incident beam is parallel to the z-axis). In reflected beam 104, as depicted by diagram 105, the angular momentum (denoted with l') remains the same (l'=+l), as the lateral components $\vec{S}_\perp$ are preserved upon reflection. (Diagram 105(a) is a perspective depiction corresponding to diagram 105). But, as depicted in diagram 106, the same reflected beam 104 has the opposite OAM value l'=−l, if viewed along the axis of reflected beam $\vec{n}_{ref}$ (which is anti-parallel to z-axis). Henceforth, throughout this disclosure using a representation where OAM values are references relative to the axis of the respective beam. More specifically, upon a normal reflection from an ideally smooth surface, an incident +l beam generates a reflected l'=−l beam. Likewise, an incident −l beam generates a reflected l'=+l beam.

When an incident beam with Poynting vector $\hat{S}_{in}$ reflects from an object, the reflected beam with Poynting vector $\hat{S}_{ref}$ may incur a Doppler-shifted frequency. The Doppler shift is determined by the component of the velocity of the surface of the target object along the change in the direction of the wave propagation. In an example case of a non-relativistic Doppler shift, $$\Delta f = \frac{f}{c}\vec{v}\cdot(\hat{S}_{ref}-\hat{S}_{in}),$$

where $\hat{S}_{in}$ is a unit vector in direction of the Poynting vector in the incident wave and $\hat{S}_{ref}$ is a unit vector in the direction of the Poynting vector in the reflected wave. Accordingly, the Doppler shift of a reflected wave may be representative of any component of the reflecting object's velocity $\vec{v}$ provided that there exists a respective change in the direction of the Poynting vector $\hat{S}_{ref}-\hat{S}_{in}$, caused by the reflection. A conventional beam with l=0 acquires the maximum Doppler shift, $\Delta f=2fv_r/c$, representative of the radial component $v_r$ of the object's velocity $\vec{v}$. Additionally, beams with imparted OAM values can be used to detect lateral velocity $\vec{v}_\perp$ of the object. However, angular momentum conservation for a reflection from an ideally smooth surface implies that a beam with OAM value l generates a reflected beam with OAM value l'=−l and the same lateral components of $\vec{S}_\perp$. Such a reflection from an ideally smooth surface may, therefore, be insensitive to $\vec{v}_\perp$. (It should be understood, however, that non-linear effects in reflection can potentially produce pairs of beams with OAMs $l'_1$=−m and $l'_2$=m−l and arbitrary m; such nonlinear reflection conserves the angular momentum while producing beams that can be sensitive to $\vec{v}_\perp$).

Figure 1C:
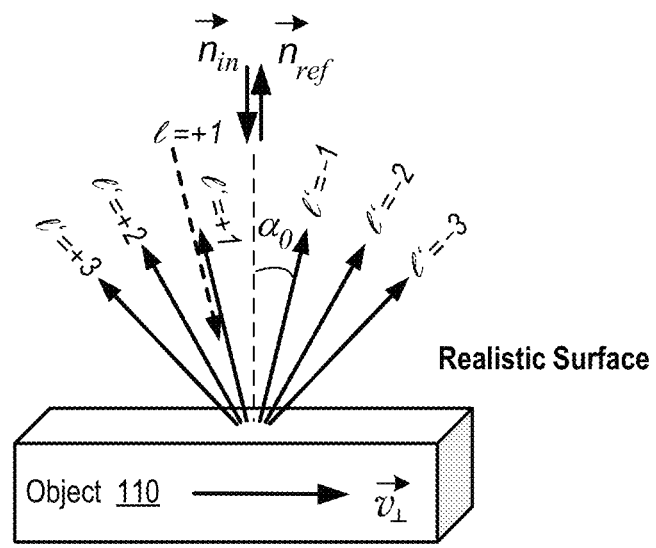
FIG. 1C is a similar depiction of the geometry of reflection from a realistic surface.

In practical applications, most surfaces have some degree of roughness that causes a non-specular (e.g., diffuse) reflection into a continuum of scattering angles. FIG. 1C is a schematic depiction of the geometry of reflection, from a realistic surface, of an incident beam with a non-zero angular momentum. Furthermore, a reflection from a surface tilted at some angle to the incident beam is not constrained by the angular momentum conservation. As a result, a beam with OAM value l (e.g., output by a lidar device) and incident at some arbitrary angle to the surface of an object (e.g., a vehicle) can generate various other OAM beams (not only with the OAM value −l), propagating along various directions in space, including along the reverse direction towards the lidar, $\vec{n}_{ref}=-\vec{n}_{in}$ (as some amount of diffuse scattering can occur in practice). More specifically, a beam with OAM value l=+2 can not only produce the l'=−2 reflected beam, but can also generate beams with other values l'=0, +2, ±1, ±3, . . . and so on, with specific amounts of energy carried by such reflected beams depending on the type and quality of the reflecting surface, angle of incidence, spectral and spatial profile of the incident beam, polarization of the incident beam, and so on. Such reflected beams can be characterized by a non-zero component of the vector $\hat{S}_{ref}-\hat{S}_{in}$ along the direction of $\vec{v}_\perp$ and, therefore, can be accompanied with a corresponding Doppler shift (which may be reduced from the maximum Doppler shift but still be detectable by the lidar RX subsystem 124). Although shown in FIG. 1C, for convenience, is the geometry of the beam incidence/reflection that is normal to the surface, a similar picture applies to a non-normal incidence/reflection from a diffuse surface with reflected beams having various values of OAM propagating along a continuum of directions, including back towards optical sensing system 120.

As an illustration, if the light is incident normally to the reflecting surface and the velocity $\vec{v}$ is along the surface, $\vec{v}\cdot\hat{S}_{in}=0$, the light reflected at a small angle α (to the normal direction to the surface) has $\vec{v}\cdot\hat{S}_{ref}=v \sin\alpha \approx \alpha v$, causing a reduced Doppler shift $\Delta f=f\alpha v/c$. As another illustration, if the reflecting object is spinning with angular velocity $\Omega=v/\rho$ around the beam's axis, the Doppler shift can be observed in reflection that occurs with a change of the OAM. More specifically, the incident beam can have a nonzero OAM l≠0, so that the Poynting vector in the incident beam makes the angle $\alpha=l\lambda/(2\pi\rho)$ with the axis of the beam (which is also assumed to be the normal direction to the surface). As a result, the dot product in the incident beam is $\vec{v}\cdot\hat{S}_{in}=+\alpha\Omega\rho$ (the sign depending on the direction of rotation) on a circle of radius ρ around the axis of rotation (which is also the axis of the beam). If the reflection is into the l'=0 OAM beam, the direction of the Poynting vector in the reflected beam is perpendicular to the surface of the object, $\vec{v}\cdot\hat{S}_{ref}=0$. Consequently, the resulting frequency shift is non-zero, $\Delta f=\pm f\alpha\Omega\rho=\pm l\Omega/(2\pi)$. Similarly, a non-zero frequency shift can occur when the reflection happens with any non-zero change of the OAM (e.g., from state with l=0 into a state with l'≠0).

Assuming, for brevity and conciseness, that detection of a lateral velocity of the object with velocity $\vec{v}_\perp$ is performed by measuring the Doppler shift that occurs when a normally-incident beam with OAM value l reflects into the beam with the same OAM value l'=l, the frequency shift may be estimated as $\Delta f(t)=f(2\alpha_0 l v_\perp/c)\cos\phi(t)$, where $\alpha_0=\alpha/l$ is the angle (per OAM value) that the Poynting vector in the incident wave makes with the normal to the surface; the factor 2 accounts for the fact that the angles are opposite for the incident and the reflected wave (and, therefore, contribute equally into the difference $\hat{S}_{ref}-\hat{S}_{in}$), cf. FIG. 1C. The azimuthal angle φ(t) between $\vec{S}_\perp$ in the incident beam and the object's velocity $\vec{v}_\perp$ arises from the helical front (e.g., a surface of a constant phase of the wave, $e^{il\phi-2\pi ift}$) of the incident OAM beam sweeping across the reflecting surface: $\phi(t)=\phi_0+2\pi ft/l$ (for l≠0). The period of rotation of $\hat{S}_{in}$ can be different for different OAM values l (and is multiple of the period of the wave, l×T=l/2πf). As a result, the reflected beam can acquire a frequency (or, equivalently, phase) modulation $\Delta f=f(2\alpha_0 l v_\perp/c)\cos(2\pi ft/l)$ that can be detected using methods of coherent light detection disclosed below (e.g., by comparing the reflected beam with a local oscillator (LO) copy of the appropriate incident beam).

Aspects and implementations of the present disclosure describe systems and methods that enable coherent determination of the linear velocity i of a reflecting object, including both the radial and the lateral components of the linear velocity. In some implementations, optical sensing system 120 may output one or more beams with non-zero imparted OAM values and detect reflected beams having a changed OAM state (e.g., a beam with OAM value l=+1 can be compared with various LO copies of the output (incident) beams with, e.g., l'=−3, −2, 0, +1, +2, +3, . . . , and so on. Additionally, in some implementations, a chirp C can be added to the frequency of the output beams (e.g., a linear chirp $f(t)=f_0\pm Ct$, or any other type of a chirp) for improved coherent detection of Doppler shifts of various OAM states. Furthermore, chirps or any other type of frequency or phase modulation can be used for range and radial velocity determination. Both frequency f of the output OAM beams and the helical tilt of the output OAM beam α (e.g. via controlling the width of the beam and the specific imparted OAM values) can be controlled by the emitting optical circuit. Also controlled can be frequency and/or phase modulation of the output OAM beams As a result, the lateral velocity $\vec{v}_\perp$ can be determined by the receiving optical circuit using single-frame measurement of the Doppler shifts Δf for various OAM beams.

The above description is intended as a conceptual illustration. In various implementations, phase modulation (e.g., digital phase encoding) can be used in place of the frequency modulation (with both types of modulation referred herein collectively as the angle modulation). The terms "optical" and "light" used throughout this disclosure should be understood to encompass any electromagnetic radiation that can be used in velocity sensing. For example, "optical" sensing can utilize a range of light visible to a human eye (e.g., the 380 to 700 nm wavelength range), the UV range (below 380 nm), the infrared range (above 700 nm), the microwave range (between 1 mm and 1 m), the radio frequency range (above 1 m), etc. In implementations, "optical" and "light" can include any other suitable range of the electromagnetic spectrum.

The optical sensing system 120 can include TX subsystem 122 that has optical and electronics circuitry to prepare and output one or more beams and direct the output beams to the object 110. The output beams are incident on the target object 110 (e.g., incident beam 102). The optical sensing system 120 can further include RX subsystem 124 that has optical and electronics circuitry to receive and process one or more beams 102 reflected from the object 110. Some of the output beams and reflected beams can be OAM beams. Some of the output beams 102 and reflected beams 104 can have zero angular momentum (e.g., a central beam) that can be used to probe the radial velocity $v_r=\vec{v}\cdot\hat{z}$. Because the radial velocity results in the Doppler shift in all reflected beams 104, the central beam can be used not only for determining the radial velocity but also for calibration of the phase information carried by other beams that have non-zero OAM values. Specifically, any net phase change that is attributable to the radial velocity Doppler shift can be subtracted from the non-zero OAM beams once the corresponding phase change of the central beam has been determined.

The optical sensing system 120 can be a part of a lidar unit (e.g., a lidar rangefinder), which can be a laser-based (or maser-based) unit of an autonomous vehicle. The lidar unit can also be capable of detecting various objects in an outside environment, which can be a driving environment, a flying environment, a naval navigation environment, and so on. The optical sensing system 120 can be configured to detect objects in the outside environment, to determine distances (e.g., using the time-of-flight detection technology) to the detected objects, to recognize the characteristics (type, size, direction of motion) of the detected objects, and so on. The optical sensing data obtained by the optical sensing system 120 can be processed by a data processing system 130. The data processing system 130 can monitor how the outside environment changes with time, e.g., by keeping track of the locations and velocities of the moving objects. The data processing system 130 can make predictions about how various moving objects in the outside environment will be positioned within a prediction time horizon.

The data gathered by the optical sensing system 120 and processed by the data processing system 130 can be used by an autonomous vehicle control system (AVCS) 140. The AVCS 140 can use one or more algorithms to control how the autonomous vehicle is to behave in various situations. The AVCS 140 can be capable of determining a route to a destination, selecting a path through an immediate environment, selecting speed and acceleration regimes, avoiding obstacles, and controlling various other actions of the autonomous vehicle. Algorithms and modules of AVCS 140 can generate instructions for various systems and components of the vehicle, such as the powertrain and steering, vehicle electronics, as well as other systems and components of the autonomous vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), or any other self-propelled vehicles capable of being operated in a self-driving mode (without a human input or with a reduced human input). "Objects" can include any entity, item, device, body, or article (animated or unanimated) located outside the autonomous, such as roadways, buildings, trees, bushes, sidewalks, bridges, mountains, other vehicles, piers, banks, landing strips, animals, birds, or other things.

Figure 2:
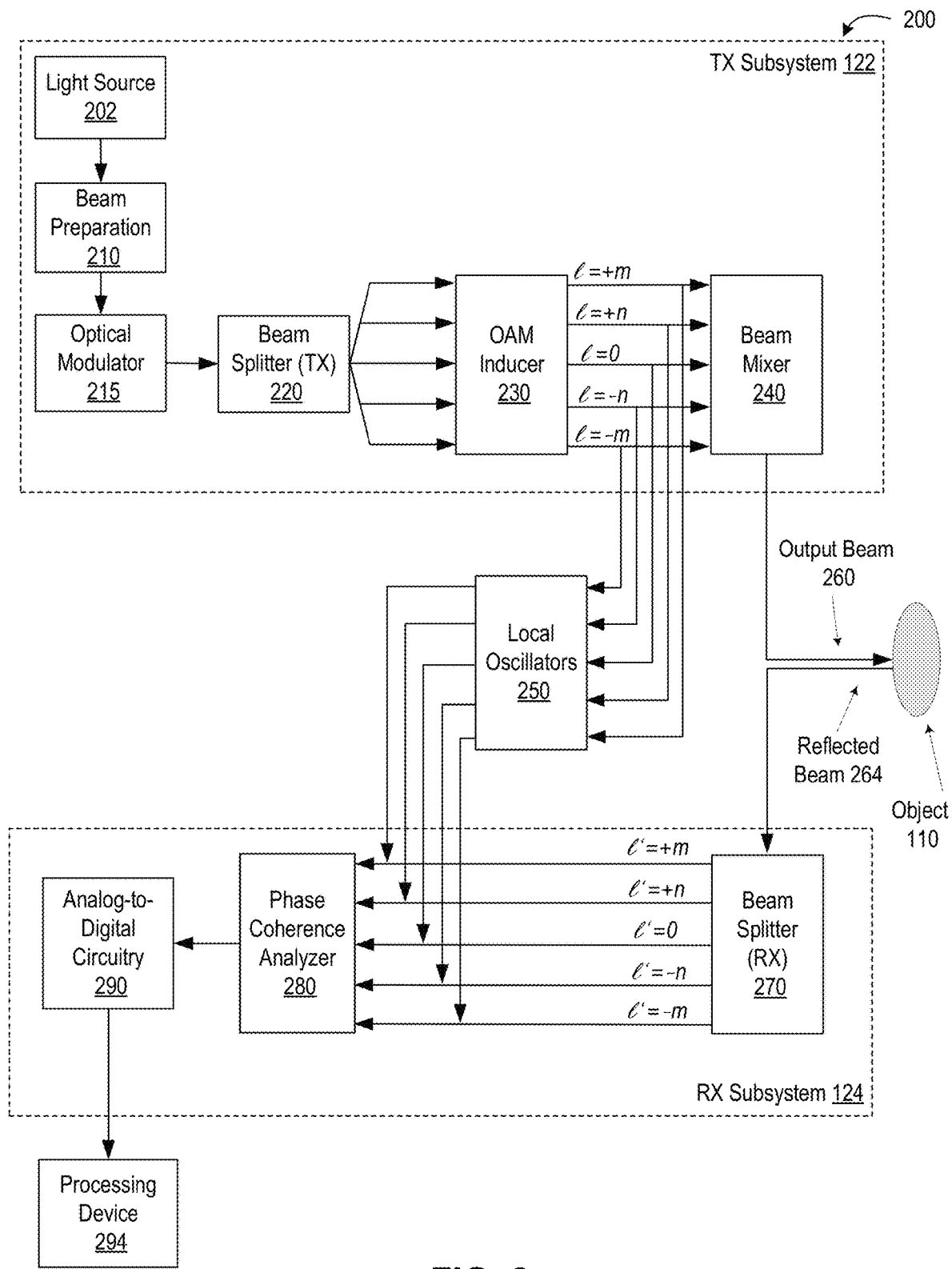
FIG. 2 is a medium-level diagram illustrating an example implementation of an optical sensing system that uses orbital angular momentum of light for multi-axis velocity detection, in accordance with some aspects of the present disclosure.

FIG. 2 is a medium-level diagram illustrating an example implementation 200 of an optical sensing system that uses orbital angular momentum of light for multi-axis velocity detection, in accordance with some aspects of the present disclosure. Depicted in FIG. 2 is a light source 202 to produce one or more beams of light. "Beams" should be understood to refer to any signals of electromagnetic radiation, such as beams, wave packets, pulses, or other signals. The light source 202 can be a narrow-band laser. The light source 202 can be a semiconductor laser, a gas laser, an ND:YAG laser, a fiber laser, a dye laser, a Vernier laser, a Quantum Cascade laser, a Quantum Stark Effect Laser, a Bragg reflector laser, a distributed feedback laser, or any other type of a laser. The light source 202 can be a continuous wave laser, a single pulse laser, a repetitively pulse laser, a mode locked laser, and the like. In some implementations, light source 202 can be a broadband laser whose output is conditioned (e.g., filtered) to produce a narrowband beam.

In some implementations, the beam of light output by the light source 202 can be processed by one or more components or elements of a beam preparation 210 part of the optical sensing system. For example, the light can be filtered, focused, collimated, diffracted, amplified, polarized, etc., to produce one or more beams of a desired spectral and spatial profile. For example, if the light source 202 is a broadband light source, the output light can be conditioned to produce a narrowband beam. The light output by beam preparation 210 can be input into an optical modulator 215 to provide modulation to the light output by beam preparation 210. "Optical modulation" is to be understood herein as referring to any form of angle modulation, such as phase modulation (e.g., any time sequence of phase changes added to the phase of the beam), frequency modulation (e.g., any sequence of frequency up-chirps and/or down-chirps), or any other type of modulation (including a combination of phase and frequency modulation) that affects the phase of the wave. Optical modulation is also to be understood herein as including, where applicable, amplitude modulation. Amplitude modulation can be applied to the light in combination with angle modulation or separately, without angle modulation. In some implementations, optical modulator 215 can use an acousto-optic modulator, a mechanical modulator, a thermo-optic modulator, or one of many classes of electro-optic modulator (e.g., a Lithium-Niobate modulator), a Mach-Zehnder modulator, a carrier-injection modulator (e.g., laser diode-based modulator) and the like, or any combination thereof.

The beam output by the optical modulator 215 can undergo spatial separation at a beam splitter (TX) 220. The beam can be delivered to the beam splitter 220 (as well as between any other components depicted in FIG. 2) over air or over beam carriers such as optical fibers or other kinds of waveguide devices. In some implementations, the beam splitter 220 can produce two or more beams following separate optical paths. The beam splitter 220 stage can use one or more dielectric plate beam splitter devices, metal-coated beam splitters, cube (e.g., prism-based) beam splitter devices, partially reflecting mirrors, beam samplers, optical fiber couplers (adapters, splicers, etc.), or other devices capable of beam-splitting function. The beam splitter 220 can produce an odd number of beams (e.g., three, five, etc.). The split beams produced by the beam splitter 220 can have non-overlapping or weakly-overlapping spatial profiles. The split beams can have different beam axes. In some implementations, the split beams can have the same or similar spatial form (e.g., radius and extent). In some implementations, the beams can have different spatial forms. For example, the beams that are to be given higher OAM values can have larger radii than the beams that are to be given lower OAM values. The beams can carry the same (or similar) amount of electromagnetic energy. In some implementations, however, some of the beams can carry more energy than other beams. For example, the beams that are to be given non-zero OAM values can carry higher amounts of energy than the beam(s) that are to have zero OAM values, or vice versa. Although shown as separate elements for the convenience of viewing, optical modulator 215 and beam splitter 220 can be implemented as a single element.

The beams produced by the beam splitter 220 can be input into an OAM inducer 230. The OAM inducer 230 can impart various values of angular momentum to different beams. One (or more) of the beams can be left unchanged, with no angular momentum imparted ($l=0$). Other beams can undergo one or more optical transformations to acquire non-zero values of the OAM ($l \neq 0$). For example, the beams can be directed through one or more vortex wave plates, which can be specially engineered crystals or non-crystalline materials having helical structures imprinted therein. In some implementations, the beams can be directed through a q-plate, which can be made of a birefringent material, a liquid crystal, a polymer, a sub-wavelength grating, a material with a spatially modulated surface ("metasurface"), or any combination thereof. In some implementations, the beams can be directed through a spatial light modulator, e.g., films of liquid crystals with imprinted holographic patterns, such as forked holograms. A beam with no OAM incident on such a forked modulator can split into two or more beams with opposite values of the OAM, ±l, with one or more split beams collected as outputs of the OAM inducer 230. In some implementations, the OAM inducer 230 can output three OAM beams having OAM values, $l=0$, $-m$, $+m$, respectively. In some implementations, the OAM inducer 230 can output five OAM beams having OAM values, $l=0$, $-n$, $-m$, $+n$, $+m$, respectively. In some implementations, more than five OAM beams can be output.

Before the OAM beams are transmitted towards the object 110, the OAM beams can be combined (mixed) into a single output beam 260 by a beam mixer 240. Even though such mixing is optional, it can be beneficial for the accuracy of the velocity determination, ensuring that all beams are reflected from the same spot on the surface of the object 110. In some implementations, the beam mixer 240 can combine the OAM beams using a setup that is reverse to the setup of the beam splitter. For example, the beam mixer 240 can use a number of optical fiber adapters coupled in reverse (in a demultiplexing setup), with two or more input fibers carrying the input beams to be combined into a single output beam (carried out by an output fiber). In some implementations, beam mixer 240 can be absent, with separate output OAM beams transmitted to the object 110.

The beam mixer 240 can be used in conjunction with a set of additional beam splitters to obtain copies, e.g., local oscillators 250, of each (or some) of the OAM beams produced by the OAM inducer 230, as indicated schematically in FIG. 2. The local oscillator copies of the OAM beams are stored to be used later, when the reflected beam 264 generated at the surface of the object 110 (in response to the output beam 260 striking the surface of the object) is received by the optical sensing system.

Because the output beam 260 has various OAM beams combined, the reflected beam 264, likewise, can arrive back at the optical sensing system as a mixture of various reflected OAM beams. The reflected beam 264 can be spatially separated into a plurality of received OAM beams by the beam splitter (RX) 270. The beam splitter 270 can be sensitive to the OAM value of the received beams. In some implementations, the beam splitter 270 can use a forked diffraction grating. In some implementations, the beam splitter 270 can be designed similar to a diffraction grating-based wavelength division multiplexer in which a regular diffraction grating is replaced with a forked diffraction grating. The spatially separated received OAM beams can be input into a phase coherence analyzer 280. The phase coherence analyzer 280 can have a number (e.g., equal to the number of the OAM beams) of phase-sensitive detectors, such as balanced photodetectors. The balanced photodetectors can detect phase coherence between the two input beams (the received reflected beam and the local copy) and can output an electric signal (e.g., a current or voltage signal) representative of the phase information (e.g., relative phase difference) carried by the two beams. As depicted schematically, the local copy of the output l=+m beam (e.g., a right-handed helical beam) may be mixed with the reflected l'=+m beam (e.g., a left handed-helical beam) while the local copy of the output l=−n may be mixed with the reflected l'=−n beam. It should be understood, however, that in various implementations, mixing of the local oscillators 250 with the reflected beams may be performed using any other mixing schemes. For example, the output l=+m beam may be mixed with the reflected l'=+n beam, the output l=+n beam may be mixed with the reflected l'=0 beam, the output l=0 beam may be mixed with the reflected l'=−n beam, and so on. Under various conditions, different mixing schemes can be more efficient than other schemes (with the optimal scheme determined empirically). Accordingly, in some implementations, RX beam splitter 270 may be configured to enable different mixing schemes, e.g., to replace (by reconfiguring optical paths of various received beams) one mixing scheme with another mixing scheme. Each of the electric signals can be provided to an analog-to-digital converter (ADC) 290, where the signals can be amplified and digitized. The digitized signal can be further provided to a processing device 294 (e.g., an FPGA, microcontroller or some other computing system).

The processing device 294 can determine, for each of the received OAM beams, an angle difference or modulation (frequency and/or phase modulation) between the received beam and the local oscillator copy of the corresponding transmitted beam. For example, the processing device 294 can employ Fourier analysis methods (e.g., fast Fourier transform methods). Based on the determined angle modulation, the processing device 294 can extract information about the components of the velocity vector $\vec{v}$. More specifically, the central l=0 component, in which the Poynting vectors of the incident $\vec{S}_{in}$ and the reflected $\vec{S}_{ref}$ beams are parallel to the direction of the beam axis can provide information about the radial component of the velocity $v_r$, based on the detected Doppler shift of the main frequency. The received satellite OAM beams with l≠0 can carry phase information that is representative of both the radial velocity $v_r$ and the components of the lateral velocity $\vec{v}_\perp$. By comparing (e.g., subtracting) the phase (and/or frequency) data of the central beam from the phase (and/or frequency) data for the satellite beams, the processing device 294 can extract the radial velocity $\vec{v}_\perp$. In some implementations, the outside environment can be such that motion of objects is restricted to a plane, e.g. a driving environment where vehicles move along a flat surface or a naval environment where surface ships move along a flat surface of water (2D environment). In such implementations, two satellite beams (e.g., OAM beams with l=−m and l=+m) can be sufficient for determining the in-plane lateral velocity (e.g., left/right components). In some implementations, where the outside environment is such that the motion of objects is three-dimensional (e.g., a flying environment or a naval environment involving submarine vessels), four satellite beams (e.g., OAM beams with l=−m, l=+m, l=−n, and l=+n) can be used to determine both components of the lateral velocity (e.g., left/right and up/down components). In some implementations, more than three total beams (in a 2D environment) and more than five total beams (in a 3D environment) can be used for added accuracy. In such implementations, the velocity components can be overdetermined (with additional data points for various components of the velocity extracted from additional pairs of the OAM beams) and the final lateral velocity value can be obtained using statistical methods, such as averaging, discarding outlier values, regression analysis, and so on.

In some implementations, the values of the angular momentum can be low, e.g. n=1 and m=2. In other implementations, the values of the angular momentum can be significantly larger, e.g., n=10, 15, 20 . . . and m=20, 25, 30 . . . , or any other integer values. In some implementations, larger OAM values can be advantageous for detection and analysis of beams reflected from uniform surfaces, because such values, generally, correspond to larger off-axis components of the Poynting vector and can, therefore, result in larger signal-to-noise ratios for the lateral velocity. In some implementations, smaller OAM values can be advantageous for detection and analysis of beams reflected from surfaces that have inhomogeneous reflectivity, texture, orientation, and so on, since smaller OAM values, generally, correspond to narrower beams that reflect off a smaller area of the object 110. In some implementations, for example, where the type of surface is not known or where diverse surface types are expected to be encountered, choosing optimal values of l (and beam sizes) can be based on balancing advantages of larger values of OAM against advantages of smaller beam sizes. Such balancing can depend on specifics of particular environments.

As indicated in FIG. 2 by dashed boxes, blocks 202-240 can be parts of the TX subsystem 122, whereas blocks 270-290 can be parts of the RX subsystem 124. It should be understood, however, that some elements and devices (e.g., beam splitters, gratings, etc.) can be shared between the two subsystems. It should similarly be understood that various blocks and components in FIG. 2 are depicted to illustrate the functionality, rather than a spatial arrangement, provided by these blocks and components. In some implementations, components that are depicted as separate blocks can in fact be implemented together, using integrated or partially integrated devices. Likewise, it should be understood that some operations performed by downstream blocks can be performed prior to operations performed by some upstream blocks. For example, some operations of the OAM inducer 230 can be performed prior to some operations of the beam splitter 220.

Figure 3A:
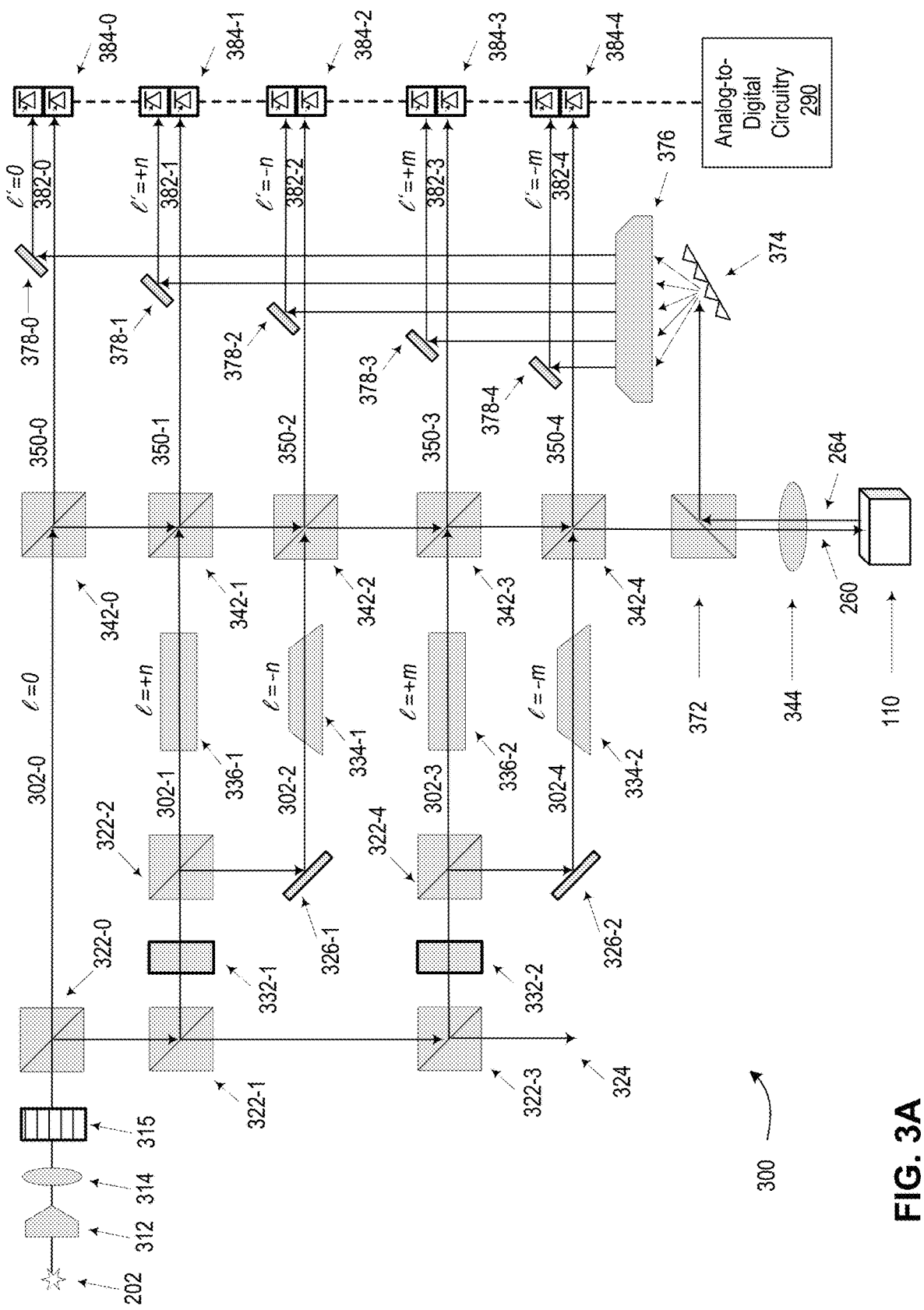
FIG. 3A is a low-level diagram illustrating an example implementation of an optical sensing system that uses orbital angular momentum of light for multi-axis velocity detection, in accordance with some aspects of the present disclosure.

FIG. 3A is a low-level diagram illustrating an example implementation 300 of an optical sensing system that uses orbital angular momentum of light for multi-axis velocity detection, in accordance with some aspects of the present disclosure. The numbering of various elements 3XY in FIG. 3A can indicate to which components 2X0 of FIG. 2 such elements can belong. For example, a lens 314 (having the same second digit) can be a part of the beam preparation 210 of FIG. 2. As drawn, FIG. 3A illustrates one possible implementation of the optical sensing system, but it should be noted that various depicted elements can be replaced with other elements having the same or similar functionality. Some elements are optional. FIG. 3A depicts an implementation that utilizes free space delivery of various optical beams within the optical sensing system.

In the implementation 300, the light emitted by the light source 202 can pass through an axicon lens 312 to transform the light into a ring-shaped beam. A ring-shaped cross section of the beam can be beneficial for more efficient production of well defined OAM states: because $l \neq 0$ beams have zero intensity along the beam axis, pre-processing incoming light into a ring-shaped beam can help achieve correctly-shaped OAM beams of high intensity. In some implementations, the axicon lens 312 can be replaced with an axicon grating, with an annular diffraction grating, or with some other diffractive optical element which produces annular beams.

After passing through the axicon lens 312 (or another optical element), the beam can be directed through a collimating lens 314 to form a collimated beam. Optical modulator 315 can provide angle (frequency or phase) modulation to the light output by axicon lens 312 and collimating lens 314. In the implementation shown, the collimated beam is split by the beam splitter 322-0. Shown is a prism-based beam splitter, but any other type of a beam splitter can be used instead, including partially-reflecting mirrors, polarizing beam splitters, beam samplers, and the like. The beam splitter 322-0 can produce two beams, in one exemplary implementation. A horizontal beam 302-0 can be the $l=0$ beam. (It should be understood that beams depicted and referenced as "horizontal" or "vertical" can have arbitrary directions in actual physical implementations.) The $l \neq 0$ beams can be produced using the second (vertical) beam that is directed to a beam splitter 322-1. The horizontal beam produced by the beam splitter 322-1 passes through a vortex wave plate 332-1 (a q-plate, a spatial light modulator, a forked diffraction grating, etc.), which imparts a first value of the OAM (e.g., $l=+n$) to the beam. Beam splitter 322-2 can subsequently split the resulting beam into two beams 302-1 and 302-2 (which can be of equal intensity). One of the beams (e.g., beam 302-2) can pass (directed by mirror 326-1) through a dove prism 334-1, which inverts the chirality of the beam 302-2 and reverses the sign of the OAM of the beam 302-2 (e.g., making a $l=-n$ beam out of the $l=+n$ beam). In various implementations, any other reflection-based chirality inverter can be used in place of the dove prism 334-1. The beam 302-1 can be transmitted through a delay cell 336-1, which can be made of the same material as the dove prism 334-1, to ensure that both beams 302-1 and 302-2 have the same phase.

Similarly, a second beam produced by beam splitter 322-1, initially being in the $l=0$, state can be directed through vortex wave plate 332-2 to impart a different OAM value (e.g., $l=+m$) to the beam 302-3. Similarly, by using beam splitter 322-4, mirror 326-2, and dove prism 334-2, a split-off beam 302-4 can be given the inverse OAM value (e.g., $l=-m$). A delay cell 336-2 can be used to ensure phase coherence of beams 302-3 and 302-4. As a result, in the implementation shown, five beams with different OAM values can be prepared: 302-0 ($l=0$), 302-1 ($l=+n$), 302-2 ($l=-n$), 302-3 ($l=+m$), and 302-4 ($l=-m$). In some implementations, fewer than five beams may be produced. In implementations where three beams are used, elements 322-3, 332-2, 322-4, 336-2, 326-2, and 334-2 can be absent and the beam splitter 322-1 can be replaced with a mirror. In some implementations, more than five OAM beams can be formed. In such implementations, the beam splitter 322-3 can output an additional beam 324 (as depicted), which can be used to generate additional OAM beams in the same (or similar) manner as described above. In those implementations where five beams are produced, the beam splitter 322-3 can be replaced with a mirror. In some implementations, a different arrangement of the optical elements from that shown in FIG. 3A can be used. For example, the axicon lens 312 can be placed between beam splitter 322-0 and 322-1. Accordingly, the $l=0$ beam 302-0 can have intensity that is concentrated near the axis of the beam.

The intensities of various OAM beams can be controlled by choosing beam splitters of different reflectance/transmittance. For example, to achieve equal intensity of all five beams 302-0 . . . 302-4, the reflectance/transmittance of the beam splitter 322-0 can be 80%/20% and the reflectance/transmittance of the beam splitters 322-1, 322-2, and 322-4 can be 50%/50% (and the beam splitter 322-3 can be replaced with a close to ideally reflecting mirror). In other implementations, non-equal intensities of the output OAM beams can be similarly arranged.

The beams 302-0 . . . 302-4 can be combined into the output beam 260 by transmitting the beams through corresponding beam splitters 342-0 . . . 342-4. The split-off beams 350-0 . . . 350-4 can be the local oscillator copies of the output OAM beams. The output beam 260 can be directed by an output optical device to the object 110. For example, the output optical device can include a field lens 344. In some implementations, the output optical device can be an aperture, a waveguide, a mirror, a beam splitter (e.g., a beam splitter 372) or some other optical device transmitting the output beam 260 to the object 110.

The reflected, from the object 110, beam 264 can pass through the field lens 344 and be deflected away from the direction of the output beam 260 by the beam splitter 372. The deflected beam can strike an OAM-sensitive diffraction grating 374, which can be a forked grating or some other OAM-sensitive scatterer. The diffraction grating 374 can separate optical passes of various OAM beams in the received reflected beam 264. The separated OAM beams can be aligned (collimated) using a scan lens 376 (or a similar optical element) before striking mirrors 378-0 . . . 378-4. The mirrors 378-0 . . . 378-4 can redirect received OAM beams 382-0 . . . 382-4 towards one of balanced photodetectors 384-0 . . . 384-4. Each of the balanced photodetectors can utilize two (or more) photodiodes connected in series. Each of the balanced photodetectors can also receive a corresponding local oscillator beam 350-0 . . . 350-4. For example, as depicted schematically in FIG. 2, one of the photodiodes can be illuminated by one of the plurality of the received OAM beams, e.g., the l'=+m beam. The second photodiode of the same photodetector can be illuminated by the corresponding local copy (stored in the local oscillators 250) of the transmitted l=−m beam. The balanced photodetectors 384-0 . . . 384-4 can detect phase differences between the two input received beams. For example, balanced photodetector 384-2 can detect phase difference between the received OAM beam 382-2 and the local oscillator copy of the output OAM beam 350-2. In some implementations, the local oscillator beams 350-0 . . . 350-4 can pass through delay cells (not shown) to compensate for a phase difference that the reflected beam 264 acquires while traveling to the object 110 and back. The balanced photodetectors 384-0 . . . 384-4 can output electric signals representative of the information about relative phases of each pair of received beams and provide output electric signals to the ADC 290 for amplification and digitization. The digitized signals can then be provided to the processing device 294 of FIG. 2. The processing device 294 can determine, based on the determined angle modulation of the received OAM beams, the components of the velocity vector $\vec{v}$. Angle modulation (e.g., a sequence of up-chirps and down-chirps or a sequence of phase shifts) imparted by optical modulator 315 may be used for determination of distances to various objects.

Figure 3B:
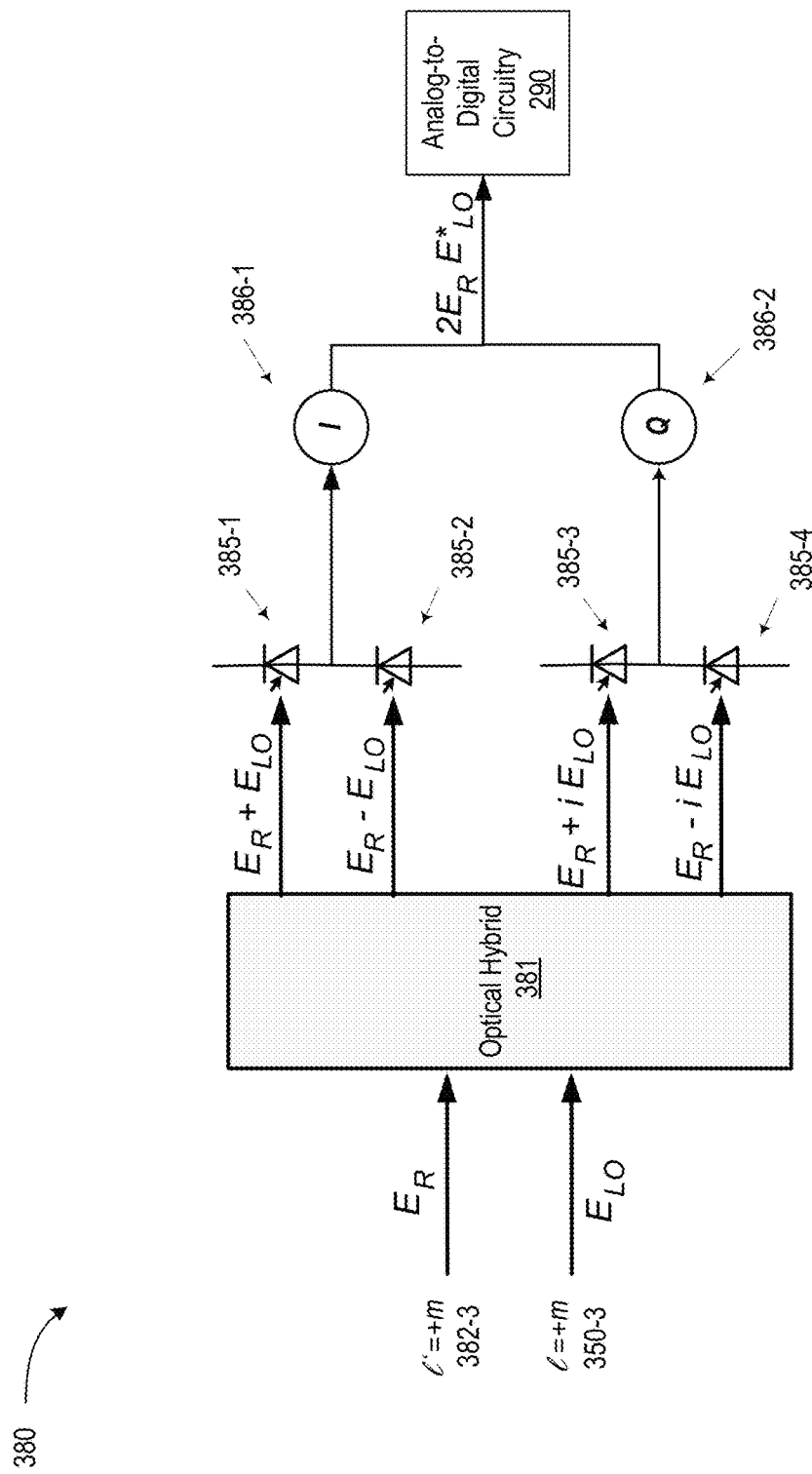
FIG. 3B is a schematic diagram illustrating coherent optical detection setup that can be used for processing light beams with imparted orbital angular momentum, in accordance with some aspects of the present disclosure.

FIG. 3B is a schematic diagram illustrating coherent optical detection setup 380 that can be used for processing light beams with imparted orbital angular momentum, in accordance with some aspects of the present disclosure. Setup 380 can be used in place of one or more balanced photodetectors 384 depicted in FIG. 3A. In one non-limiting example, a reflected beam, e.g., beam 382-3 with 1'=+m, and an LO copy 350-3 of the output beam 382-3 with l=+m can be input into optical hybrid element 381. Optical hybrid element 381 may be designed to split each of the input beams into multiple copies (shown is splitting into four copies), phase-delaying some of the copies (e.g., copies of the LO beam) using controlled phase shifts (e.g., 90°, 180°, 270°) and mixing with the phase-delayed copies of the other input beams (e.g., copies of reflected beam 382-3) to obtain in-phase symmetric and anti-symmetric combinations $(E_R+E_{LO})/2$ and $(E_R−E_{LO})/2$ of the two beams, and quadrature 90-degree-shifted combinations $(E_R+iE_{LO})/2$ and $(E_R−iE_{LO})/2$ of the two beams. Each of the mixed signals can then be received by respective photodiodes 385-1 . . . 385-4, which can be in (paired) balanced configurations. An in-phase electric current I can be produced by a first pair of photodiodes 385-1 and 385-2 and a quadrature current Q can be produced by a second pair of photodiodes 385-3 and 385-4. Each of the currents can further be received and processed by circuits 386-1 and 386-2, which may include one or more operational amplifiers, intermediate frequency amplifiers, and the like. The in-phase and quadrature currents can then be mixed into a complex photocurrent representative of the phase difference between two beams of light 350-3 and 382-3. The photocurrent can then be processed by analog-to-digital circuitry 290.

Figure 4:
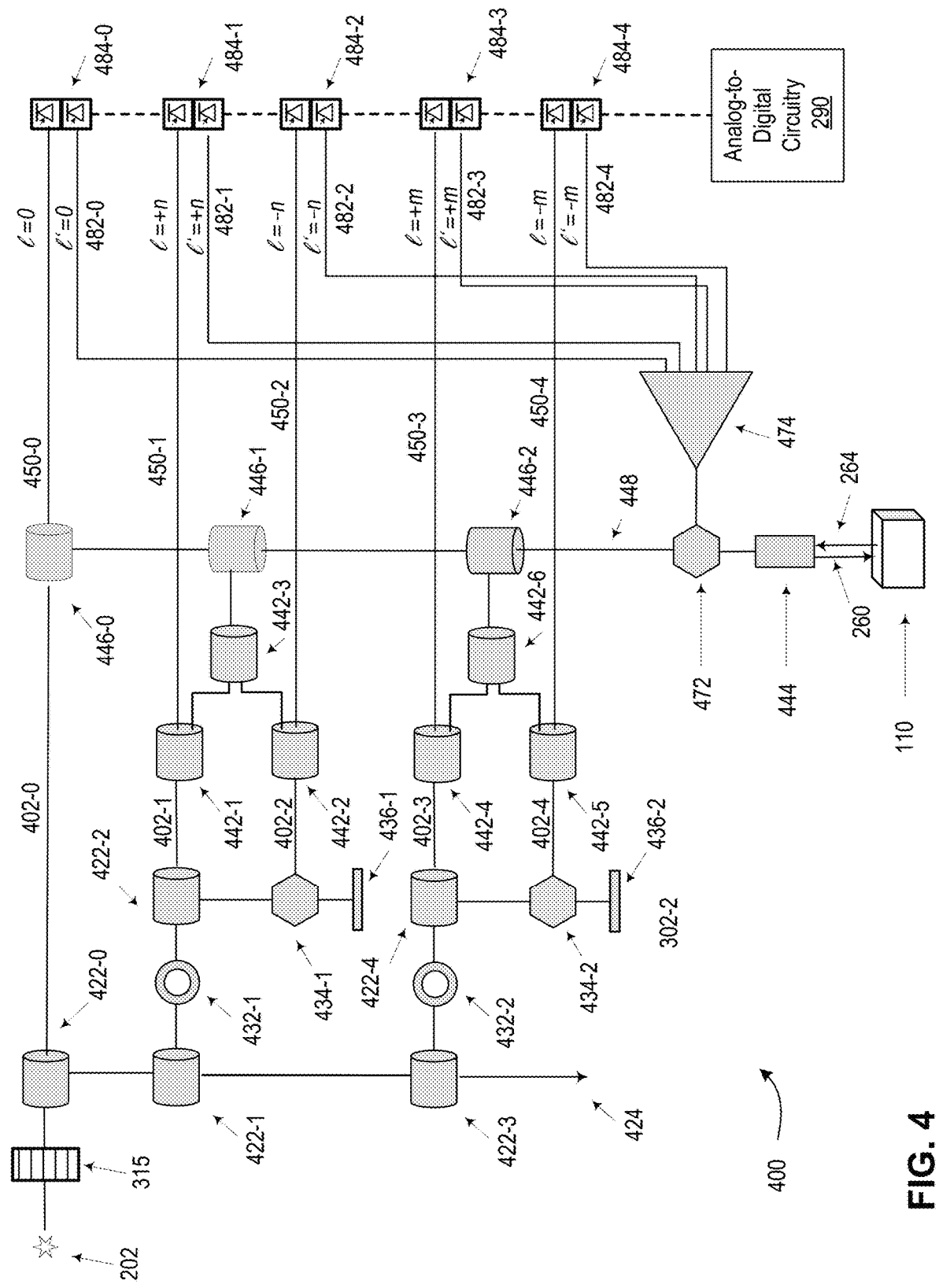
FIG. 4 is a schematic illustration of another example implementation of an optical sensing system that uses orbital angular momentum of light for multi-axis velocity detection, in accordance with some aspects of the present disclosure.

FIG. 4 is a schematic illustration of another example implementation 400 of an optical sensing system that uses orbital angular momentum of light for multi-axis velocity detection, in accordance with some aspects of the present disclosure. The numbering of various elements 4XY in FIG. 4 indicates to which components 2X0 of FIG. 2 such elements can belong. For example, optical circulator 472 (having the same second digit) can be a part of the beam splitter (RX) 270 of FIG. 2. As drawn, FIG. 4 illustrates one possible implementation of the optical sensing system, but it should be noted that various depicted elements can be replaced with other elements having the same or similar functionality. Some elements are optional. FIG. 4 depicts an implementation that utilizes optical fiber delivery of various optical beams within the optical sensing system. Lines in FIG. 4 indicate optical fibers, which can be fibers capable of maintaining OAM signatures of light carried by the fibers. The lines are depicted as straight lines for convenience only and actual physical implementations may have fibers of any configuration.

In the implementation 400, the light emitted by the light source 202 can be collected by an optical fiber delivered to the optical coupler (optical fiber adaptor) 422-0, which can provide a functionality similar to the functionality of the beam splitter 322-0 in the system depicted in FIG. 3A. The optical coupler 422-0 (as well as other optical couplers in FIG. 4) can be a Y-coupler or a T-coupler or any other type of coupler. Shown are couplers with three external fibers, but couplers with any number of external fibers can be used instead. For example, a single coupler with one input fiber and three output fibers can be used in place of three optical couplers 422-0, 422-1, and 422-3. Some of the optical couplers in FIG. 4 can be active couplers. As depicted, the optical coupler 422-0 produces two beams. A horizontal beam 402-0 can be the l=0 beam. The l≠0 beams can be generated using the second beam that is directed to another optical coupler 422-1. The horizontal beam produced by the optical coupler 422-1 can pass through a (fiber-coupled) vortex generator 432-1, which imparts a first value of the OAM (e.g., l=+m) to the passing beam. Optical coupler 422-2 can then split the resulting beam into two beams 402-1 and 402-2 (which can be of equal intensity). One of the beams (e.g., beam 402-2) can pass through an optical circulator 434-1 and reflect off a mirror 436-1 to reverse the sign of its OAM (e.g., making a l=−m beam out of the l=+m beam). To account for an additional phase collected by the beam 402-2 during passage through the optical circulator 434-1 and reflection off the mirror 436-1, the other beam 402-1 can be transmitted through a longer fiber with the length selected to ensure that both beams 302-1 and 302-2 have the same phase.

Similarly, a second beam produced by optical coupler 422-1 initially being in the l=0 state can be directed through vortex generator 432-2 to impart a different OAM value (e.g., l=+n) to the beam 402-3. Similarly, by using optical coupler 422-4, optical circulator 434-2, and mirror 436-2, a split-off beam 402-4 can be given the inverse OAM value (e.g., l=−n). As a result, in the implementation shown, five beams with different OAM values can be prepared: 402-0 (l=0), 402-1 (l=+m), 402-2 (l=−m), 402-3 (l=+n), and 402-4 (l=−n). In some implementations, only three beams can be formed. In some implementations, more than five OAM beams can be formed. In such implementations, the optical coupler 422-3 can have an additional output 424 (as depicted), which can be used to generate additional OAM beams in the same manner as described above. In those implementations, where three beams are produced, the optical coupler 422-3 (and other components that are downstream of optical coupler 422-3) can be absent.

The beams 402-0 . . . 402-4 can be combined into the output beam 260. In one implementation, portions of the beams 402-1 and 402-1, collected by optical couplers 442-1 and 442-2, respectively, can be combined, using optical coupler 442-3 and optical coupler 446-1, with a portion of the central beam 402-0 (collected using optical coupler 446-0) into the master beam 448. Added to the master beam 448 can be portions of the beams 402-3 and 402-4, collected by optical couplers 442-4 and 442-5, respectively, and combined, using optical coupler 442-6 and optical coupler 446-2.

The split-off portions 450-0 . . . 450-4 of the beams 402-0 . . . 402-4 can be the local oscillator copies of the output OAM beams. The master beam 448 can pass through an output optical device, which can transmit the output beam 260 to the object 110. For example, the output optical device can include an optical circulator 472, a collimator 444, or some other optical device capable of transmitting the output beam 260 to the object 110.

The reflected, from the object 110, beam 264 can be received through the collimator 444, in some implementations. In some implementations, the reflected beam can bypass the collimator 444. The received reflected beam can pass through the optical circulator 472 to be redirected to an OAM-sensitive division multiplexer 474 to separate the OAM beams into different optical fibers. The separated OAM beams 482-0 . . . 482-4 can be received by one of a set of balanced photodetectors 484-0 . . . 484-4 together with a corresponding local oscillator beam 450-0 . . . 450-4. The balanced photodetectors 484-0 . . . 484-4 can detect differences between the two corresponding input beams, generate electric signals representative of the information about relative phases of each pair of the beams input into the photodetector, and provide the output electric signal to the ADC 290 for amplification and digitization. The digitized signals can then be provided to the processing device 294, which can determine, based on the determined angle modulation of the received OAM beams, the components of the velocity vector $\vec{v}$.

In some implementations, one or more optical elements and components depicted in FIGS. 3 and 4 can be integrated using photonic integrated circuits.

The implementations shown in FIGS. 3 and 4 can output polarized beams, e.g., linearly-polarized beams, circularly polarized beams, elliptically polarized beams, partially-polarized beams, and so on. In some implementations, multiple copies of each output OAM beam can be transmitted to the object 110, e.g., two copies of each beam having different polarizations (e.g., circularly polarized left-handed and right-handed beams). Polarization can be achieved with some of the elements of the TX subsystem 122 shown in FIGS. 3 and 4 (e.g., some of the beam splitters) being polarizing elements, or with additional polarizers not shown explicitly in in FIGS. 3 and 4. Similarly, the RX subsystem 124 can include polarizers to separate various polarizations of the received beam 264 or some of its components 382 or 482.

Figure 5:
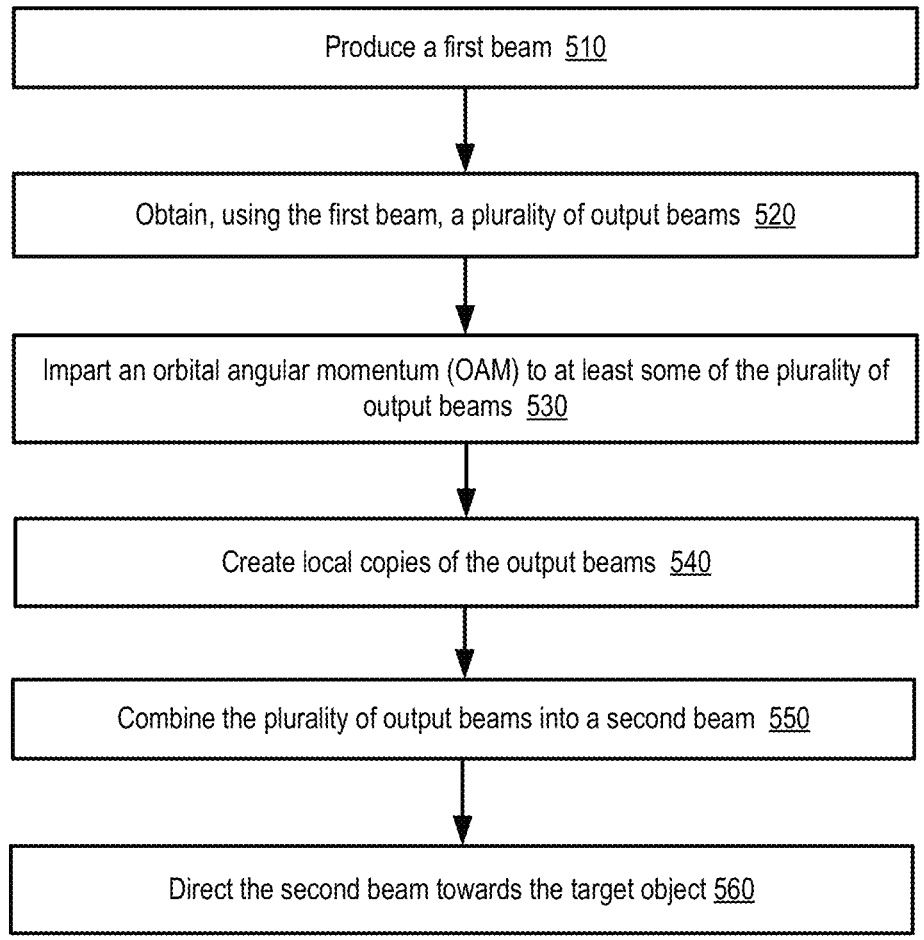
FIG. 5 depicts a flow diagram of an example method of preparing output beams for multi-axis velocity detection using orbital angular momentum of light, in accordance with some implementations of the present disclosure.

FIG. 5 depicts a flow diagram of an example method 500 of preparation of output beams for multi-axis velocity detection using orbital angular momentum of light, in accordance with some implementations of the present disclosure. Method 500, as well as method 600 described below in relation to FIG. 6, can be performed using systems and components described in relation to FIGS. 1-4, e.g., by the optical sensing system 120. Various operations of methods 500 and 600 can be performed in a different order compared with the order shown in FIGS. 5-6. Some operations of methods 500 and 600 can be performed concurrently with other operations. Some operations can be optional. Methods 500 and 600 can be used in autonomous driving vehicle environments using multi-axis velocity detection technology described above. Methods 500 and 600 can be used to improve the autonomous vehicle's response times as well as accuracy and efficiency of sensing of various outside objects.

Method 500 can include producing, at block 510, a first beam by a light source. The first beam can have an extent in time that exceeds the time required for a light signal to cover a distance from an optical sensing system to a target object and back to the optical sensing system. The first beam can be a coherent beam, e.g., a laser beam. At block 520, method 500 can continue with obtaining, using the first beam, a set of output beams. For example, the first beam can be split into the set of output beams by one or more beam splitting optical elements, such as beam splitting plates, prisms, optical fiber couplers, and the like. In some implementations, the first beam, the output beams, and other beams generated or received by the optical sensing system can be delivered between various optical devices and components of the optical sensing system via optical fibers. In some implementations, the first beam, the output beams, and other beams can be delivered over air (free space delivery).

At block 530, method 500 can continue with imparting, using one or more first optical elements, an orbital angular momentum (OAM) to at least some of the set of output beams. The first optical element(s) can include a vortex wave plate, a forked diffraction grating, a hologram, a spatial light modulator, or any other optical element capable of imparting a helical structure to a beam's wave front, or any combination of such elements. The output beams with imparted OAM can be Hermite-Gaussian beams, Laguerre-Gaussian beams, hypergeometric-Gaussian beams, or other types of OAM beams. In some implementations, a number of output beams can be odd. A first (central) output beam can have a zero OAM (l=0). The remaining output beams can include one or more pairs of output beams, each pair having equal OAM values. For example, a first pair can have l=±10 OAM values, the second pair can have l=±16, and so on. Any other values can be used instead, e.g., l=±1, ±2 . . . values. In some implementations, at least some of the output beams can have angle modulation, e.g., a phase modulation or a frequency modulation, such as chirp modulation. In some implementations, the angle modulation can be intrinsic, e.g., acquired by the beam due to passage through various optical elements (prisms, delay cells, diffraction gratings, and the like) that possess dispersion. Phase modulation can include a series of phase boosts (shifts) of predetermined duration, spacing, repetition rate, and the like. Frequency modulation can include a series of up-chirps (frequency increases), down-chirps (frequency decreases), which can be linear or non-linear chirps of predetermined bandwidth, slope, repetition rate, and the like. In some implementations, the angle modulation can be designed and controlled using one or more optical elements that impart various chirps to the output beams, such as acousto-optic modulators, thermo-optic modulators, mechanical modulators or electro-optic modulators such as Lithium Niobate modulators, Mach-Zehnder modulators, carrier-injection modulators (e.g., laser diode-based modulator) and the like. In one implementation, up-chirps may be interspersed with down-chirps, e.g., a 200-microsecond up-chirp may be followed by a 200-microsecond down-chirp, and so on. In some implementations, durations of chirps can be different from 200 us (e.g., 2 us, 50 us, 300 us, or any other durations). In various implementations, chirps can be linear or nonlinear.

At block 540, method 500 can continue with creating local copies of the output beams. For example, the local copies can be beams that are copies of the output beams, e.g., using beam splitting optical elements, and can be phase-coherent (carry the same phase information) with the output beams. At block 550, method 500 can continue with combining the set of output beams into a second beam in which the output beams have overlapping spatial profiles. For example, the output beams can have the same axis of symmetry. Combining (e.g., centering) of the output beams can be achieved by using beam-splitting elements, as illustrated in FIGS. 3 and 4. At block 560, method 500 can continue with directing the (combined) second beam towards the target object. The combined beam can be collimated, focused, and/or filtered before the beam is transmitted to the target object.

Figure 6:
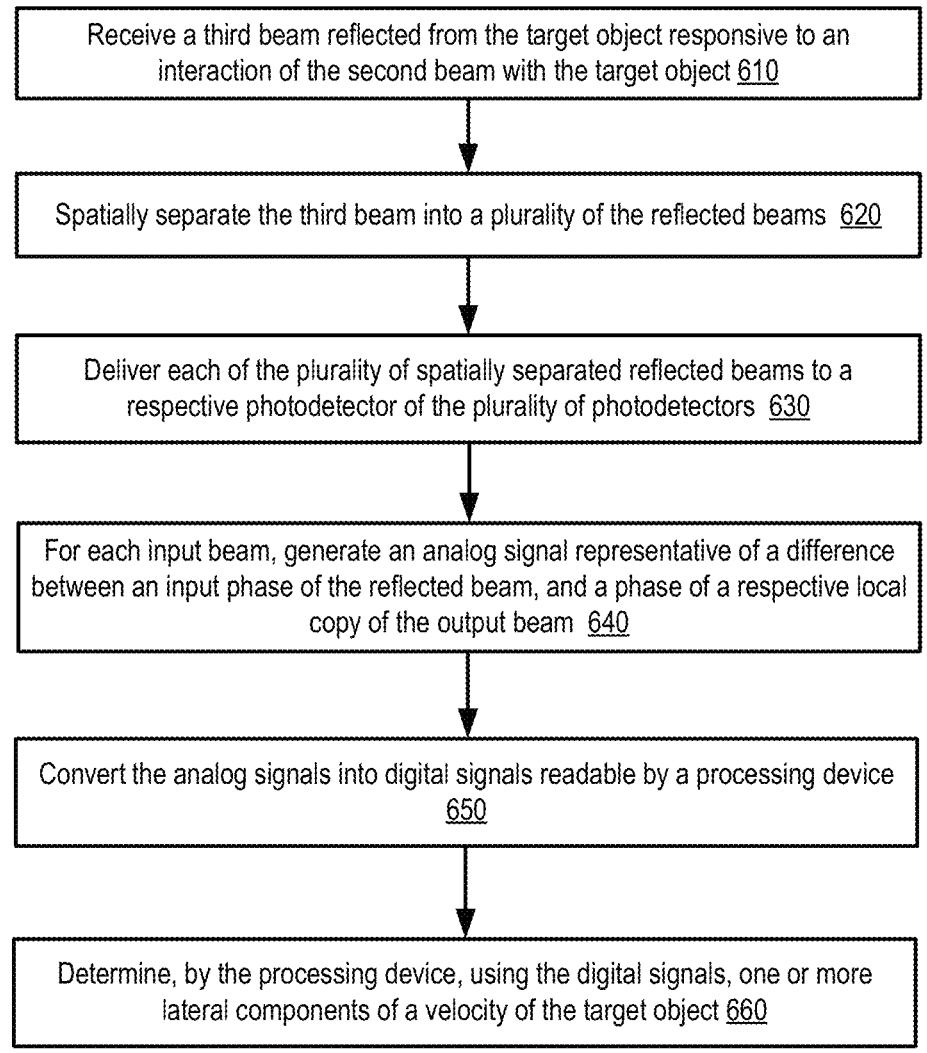
FIG. 6 depicts a flow diagram of an example method of processing reflected beams for multi-axis velocity detection using orbital angular momentum of light, in accordance with some implementations of the present disclosure.

FIG. 6 depicts a flow diagram of an example method 600 of processing of reflected beams for multi-axis velocity detection using orbital angular momentum of light, in accordance with some implementations of the present disclosure. Method 600 can be used in combination with method 500. Method 600 can be performed by a separate component of the optical sensing system than the component(s) that perform method 500. Method 600 can be performed by the same component(s) that perform method 500. For example, the output beams and the reflected beams can pass through the same elements of the optical sensing systems, e.g., the same field lens, beam splitter(s), collimators, optical fibers, and/or other elements. In some implementations, methods 500 and 600 can be performed by different optical sensing systems.

Method 600 can include receiving, at block 610, a third beam reflected from the target object. The third beam can be generated responsive to an interaction of the second beam with the target object (e.g., the third beam can be a reflected second beam). The third beam can include a set of (reflected) reflected beams. Each of the reflected beams can be a beam generated in response to the corresponding output beam striking the target object. Some or all of the reflected beams reflected from the target object can have overlapping spatial profiles, e.g., be centered around the same axis.

At block 620, method 600 can continue with spatially separating the reflected beams so that the reflected beams follow different optical paths within the optical sensing system. Spatial separation of the reflected beams can be achieved by using one or more OAM-sensitive optical elements, such as forked diffraction gratings, holograms, vortex wave plates, spatial light modulators, or the like (or some combination thereof). At block 630, method 600 can continue with delivering the spatially separated reflected beams to a respective photodetector of the plurality of photodetectors. The delivery can be made over air or via optical fibers. The photodetectors can be balanced photodetectors. Each photodetector can include a first photodiode and a second photodiode. The first photodiode can receive one of the reflected beams and the second photodiode can receive the local copy of the output beam that corresponds to the reflected beam received by the first photodiode.

At block 640, method 600 can continue with each of the photodetectors generating an analog signal representative of a difference between an input phase information, carried by the reflected beam, and an output phase information, carried by the local copy of the output beam. For example, the photodetectors can be so configured that identical electromagnetic fields incident on the pair of photodiodes of the photodetector (i.e. identical amplitude and phase) result in a zero net current generated in the photodetector circuit, whereas different electromagnetic fields lead to non-zero analog signals (e.g., current or voltage signals) generated in the photodetector circuit. At block 650, method 600 can continue with an analog-to-digital converter converting each of the analog signals generated by the photodetectors into digital signals readable by a processing device. At block 660, method 600 can continue with the processing device receiving the converted digital signals and determining one or more lateral, to a direction to the target object, components of a velocity of the target object. Additionally, the processing device can use the converted digital signals to determine the radial component of the velocity of the target object.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
a light source to produce a first beam;
one or more first optical elements to impart an orbital angular momentum (OAM) to at least some of a plurality of output beams, wherein each of the plurality of output beams is obtained from the first beam;
an output optical device to direct the plurality of output beams towards a target object;
a plurality of photodetectors, wherein each of the plurality of photodetectors is to generate a signal representative of a difference between an input phase information, carried by one of a plurality of reflected beams, and an output phase information, carried by one of a plurality of local copies of the output beams, wherein at least one of the plurality of reflected beams is reflected from the target object in response to the plurality of output beams interacting with the target object; and
a processing device to determine, using the difference between the input phase information and the output phase information, one or more components of a velocity of the target object, wherein the one or more components are orthogonal to a direction to the target object.

2. The system of claim 1, wherein one or more first optical elements comprise at least one of a vortex wave plate, a forked diffraction grating, a hologram, or a spatial light modulator.

3. The system of claim 1, further comprising a plurality of beam splitting optical elements to produce, using the first beam, the plurality of output beams.

4. The system of claim 3, wherein one or more of the plurality of beam splitting optical elements comprises an optical fiber coupler.

5. The system of claim 1, wherein a number of output beams of the plurality of output beams is odd, wherein a first output beam of the plurality of output beams has a zero OAM value, and wherein the plurality of output beams comprises one or more pairs of output beams, each pair having equal OAM values.

6. The system of claim 1, wherein the output optical device directs a second beam towards the target object, wherein the second beam comprises mixed output beams of the plurality of output beams.

7. The system of claim 1, wherein the output optical device comprises at least one of a field lens or a collimator lens.

8. The system of claim 1, wherein at least some of the plurality of the reflected beams have overlapping spatial profiles and are spatially separated, prior to interacting with respective photodetectors of the plurality of photodetectors, using one or more OAM-sensitive second optical elements.

9. The system of claim 1, wherein the processing device is further to determine, using the difference between the input phase information and the output phase information, a radial component of the velocity of the target object.

10. The system of claim 1, wherein at least some of the plurality of photodetectors comprise a first photodiode and a second photodiode, the first photodiode to receive a reflected beam of the plurality of reflected beams, and the second photodiode to receive a local copy of the plurality of the local copies of the output beams.

11. The system of claim 1, wherein at least some of the plurality of output beams are angle-modulated beams, wherein angle modulation comprises at least one of a phase modulation or a frequency modulation.

12. A system comprising:
a light source to produce a first beam;
one or more first optical elements to impart an orbital angular momentum (OAM) to at least some of a plurality of output beams, wherein each of the plurality of the output beams is obtained from the first beam;
an output optical device to direct the plurality of output beams towards a target object;
a plurality of photodetectors, wherein each of the plurality of photodetectors is to generate an analog signal representative of a difference between an input phase information, carried by one of a plurality of reflected beams, and an output phase information, carried by one of a plurality of local copies of the output beams, wherein at least one of the plurality of reflected beams is reflected from the target object in response to the plurality of output beams interacting with the target object; and
an analog-to-digital converter to convert, for each of the plurality of photodetectors, the analog signal generated by a respective photodetector into a digital signal readable by a processing device.

13. A method comprising:
producing, by a light source, a first beam;
imparting, using one or more first optical elements, an orbital angular momentum (OAM) to at least some of a plurality of output beams, wherein each of the plurality of the output beams is obtained from the first beam;
directing, by an output optical device, the plurality of output beams towards a target object;
generating, using a plurality of photodetectors, a signal representative of a difference between an input phase information, carried by one of a plurality of reflected beams, and an output phase information, carried by one of a plurality of local copies of the output beams, wherein at least one of the plurality of reflected beams is reflected from the target object in response to the plurality of output beams interacting with the target object; and
determining, by a processing device, using the generated signal, one or more components of a velocity of the target object, wherein the one or more components are lateral to a direction to the target object.

14. The method of claim 13, wherein one or more first optical elements comprise at least one of a vortex wave plate, a forked diffraction grating, a hologram, or a spatial light modulator.

15. The method of claim 13, wherein each of the plurality of the output beams is obtained from the first beam using a plurality of beam splitting optical elements.

16. The method of claim 15, wherein one or more of the plurality of beam splitting optical elements comprises an optical fiber coupler.

17. The method of claim 13, wherein a number of output beams of the plurality of output beams is odd, wherein a first output beam of the plurality of output beams has a zero OAM value, and wherein the plurality of output beams comprises one or more pairs of output beams, each pair having equal OAM values.

18. The method of claim 13, wherein directing the plurality of output beams towards the target object comprises:
   combining the plurality of output beams into a second beam, wherein at least some of the plurality of output beams in the second beam have overlapping spatial profile; and
   directing the second beam towards the target object.

19. The method of claim 13, wherein at least some of the plurality of the reflected beams have overlapping spatial profiles.

20. The method of claim 19, further comprising:
   spatially separating, using one or more second optical elements, the plurality of the reflected beams, wherein the one or more second optical elements are OAM-sensitive optical elements; and
   delivering each of the plurality of spatially separated reflected beams to a respective photodetector of the plurality of photodetectors.

* * * * *